(12) United States Patent
Murofushi

(10) Patent No.: US 9,170,770 B2
(45) Date of Patent: Oct. 27, 2015

(54) VEHICLE CONTROLLER

(71) Applicant: Fuji Jukogyo Kabushiki Kaisha, Tokyo (JP)

(72) Inventor: Toru Murofushi, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 121 days.

(21) Appl. No.: 14/062,827

(22) Filed: Oct. 24, 2013

(65) Prior Publication Data

US 2014/0121929 A1    May 1, 2014

(30) Foreign Application Priority Data

Oct. 25, 2012 (JP) .................................. 2012-235538

(51) Int. Cl.
| | | |
|---|---|---|
| *B60W 30/182* | (2012.01) | |
| *B60W 30/18* | (2012.01) | |
| *G06F 7/00* | (2006.01) | |

(52) U.S. Cl.
CPC .................. *G06F 7/00* (2013.01); *B60W 30/18* (2013.01); *B60W 30/182* (2013.01)

(58) Field of Classification Search
None
See application file for complete search history.

(56) References Cited

U.S. PATENT DOCUMENTS

2006/0080023 A1* 4/2006 Hrovat et al. .................... 701/82
2007/0032913 A1* 2/2007 Ghoneim et al. .................. 701/1

FOREIGN PATENT DOCUMENTS

| JP | H02-127156 A | 5/1990 |
|---|---|---|
| JP | H11-198677 A | 7/1999 |

\* cited by examiner

*Primary Examiner* — John R Olszewski
*Assistant Examiner* — Gerrad A Foster
(74) *Attorney, Agent, or Firm* — Troutman Sanders LLP

(57) ABSTRACT

A vehicle controller has multiple vehicle control modes that have different output characteristics of a travel power source relative to an accelerator operation amount. The vehicle control modes include a poor road travel mode used during travel on a poor road, and a first normal travel mode and a second normal travel mode that are used during travel other than on a poor road. A rate of increase in an output of the travel power source relative to a predetermined accelerator operation amount during an initial stage of an accelerator operation is set to increase steadily in order of the poor road travel mode, the first normal travel mode, and the second normal travel mode. When the poor road travel mode is selected, a mode transition to the first normal travel mode is permitted but a mode transition to the second normal travel mode is prohibited.

9 Claims, 3 Drawing Sheets

VEHICLE CONTROLLER

CROSS-REFERENCE TO RELATED APPLICATIONS

The present application claims priority from Japanese Patent Application No. 2012-235538, filed on Oct. 25, 2012, the entire contents of which are hereby incorporated by reference.

BACKGROUND

1. Technical Field

The present invention relates to vehicle controllers, and more particularly, to the prevention of rapid acceleration unintended by a driver during a transition from a poor road travel mode, in which a rate at which an output increases relative to an accelerator operation during an initial stage of the accelerator operation is suppressed, to another travel mode.

2. Related Art

An apparatus with which various types of control, such as engine characteristic control and shift characteristic control, can be selected from a plurality of modes in accordance with preferences of a driver and a vehicle use condition has been proposed for use in a vehicle such as an automobile.

For example, it has been proposed that a sport travel mode or the like, in which shift control is modified such that a rate at which an engine torque increases in response to an accelerator operation is increased, and in which the engine is more likely to be used at a comparatively high rotation speed, be provided in addition to a normally used vehicle control mode, and that a driver be able to perform an operation to switch between the respective modes.

Conventional vehicle control mode switching includes a technique disclosed in Japanese Unexamined Patent Application Publication (JP-A) No. H11-198677. According to the technique, in a vehicle that performs adaptive cruise control (ACC) for maintaining a predetermined inter-vehicle distance to a leading vehicle, adaptive cruise control processing is terminated when it is determined, on the basis of an operation of an antilock brake control device, that the vehicle is traveling on a road surface having a low frictional coefficient such as a snowy road or a frozen road.

Further, a technique disclosed in JP-A No. H2-127156 provides a low speed travel mode in which a brake is operated in conjunction with an accelerator OFF operation, the low speed travel mode being canceled automatically when a cancellation condition relating to a vehicle speed or the like is established.

It has been proposed recently that a poor road travel mode, in which the engine torque increase rate during the initial stage of the accelerator operation is suppressed in comparison with the vehicle travel mode used during normal travel, be provided in an SUV vehicle or the like, in which importance is placed on a travel performance on poor roads, in order to improve operability during travel on poor roads.

However, a vehicle may have a plurality of normal travel modes with different output characteristics relative to the accelerator operation, and when, in such a vehicle, a transition is performed from the poor road travel mode to a normal travel mode, from among the plurality of normal travel modes, in which the output characteristic during the initial stage of the accelerator operation is dramatically different to that of the poor road travel mode, a high output unintended by the driver may be generated, causing the vehicle to accelerate rapidly.

SUMMARY OF THE INVENTION

An object of the present invention is to provide a vehicle controller that prevents rapid acceleration unintended by a driver during a transition from a poor road travel mode, in which a rate at which an output increases relative to an accelerator operation during an initial stage of the accelerator operation is suppressed, to another travel mode.

An aspect of the invention provides a vehicle controller having vehicle control modes that have different output characteristics of a travel power source relative to an accelerator operation amount. The vehicle control modes include a poor road travel mode used during travel on a poor road, and a first normal travel mode and a second normal travel modes that are used during travel other than on a poor road. A rate of increase in an output of the travel power source relative to a predetermined accelerator operation amount during an initial stage of an accelerator operation is set to increase steadily in order of the poor road travel mode, the first normal travel mode, and the second normal travel mode. When the poor road travel mode is selected, a mode transition to the first normal travel mode is permitted but a mode transition to the second normal travel mode is prohibited.

Note that in the specification, claims, and so on, a "poor road" includes an irregular road such as an unpaved road and a road surface having a low frictional coefficient such as a snowy road or a frozen road.

When a travel speed of a vehicle reaches or exceeds a predetermined value while the poor road travel mode is selected, a mode transition to the first normal travel mode may be performed automatically.

When a predetermined operation to terminate the poor road travel mode is input by a user while the poor road travel mode is selected, a mode transition to the first normal travel mode may be performed.

The vehicle controller may further include a slippage detector to detect slippage of all or a part of vehicle wheels. When slippage is detected while the poor road travel mode is selected, a mode transition to the first normal travel mode may be prohibited regardless of other conditions.

DETAILED DESCRIPTION

The present invention achieves the object of providing a vehicle controller that prevents rapid acceleration unintended by a driver during a transition from a poor road travel mode, in which a rate at which an output increases relative to an accelerator operation during an initial stage of the accelerator operation is suppressed, to another travel mode by ensuring that, while returning from the poor road travel mode, a transition is performed to a mode, from among modes used during normal travel, in which a correlation between an accelerator operation amount and an engine torque increase rate during an initial stage of an accelerator operation is closest to that of the poor road travel mode, and prohibiting a transition to another mode.

EXAMPLES

An example of a vehicle controller to which the present invention is applied will be described below.

The vehicle controller according to this example is installed in an automobile such as an SUV type passenger vehicle, for instance.

The automobile is a four wheel drive vehicle having a gasoline engine that performs output adjustment using a throttle as a travel power source, for instance. However, the type and driving system of the travel power source is not limited thereto.

Figure 1:
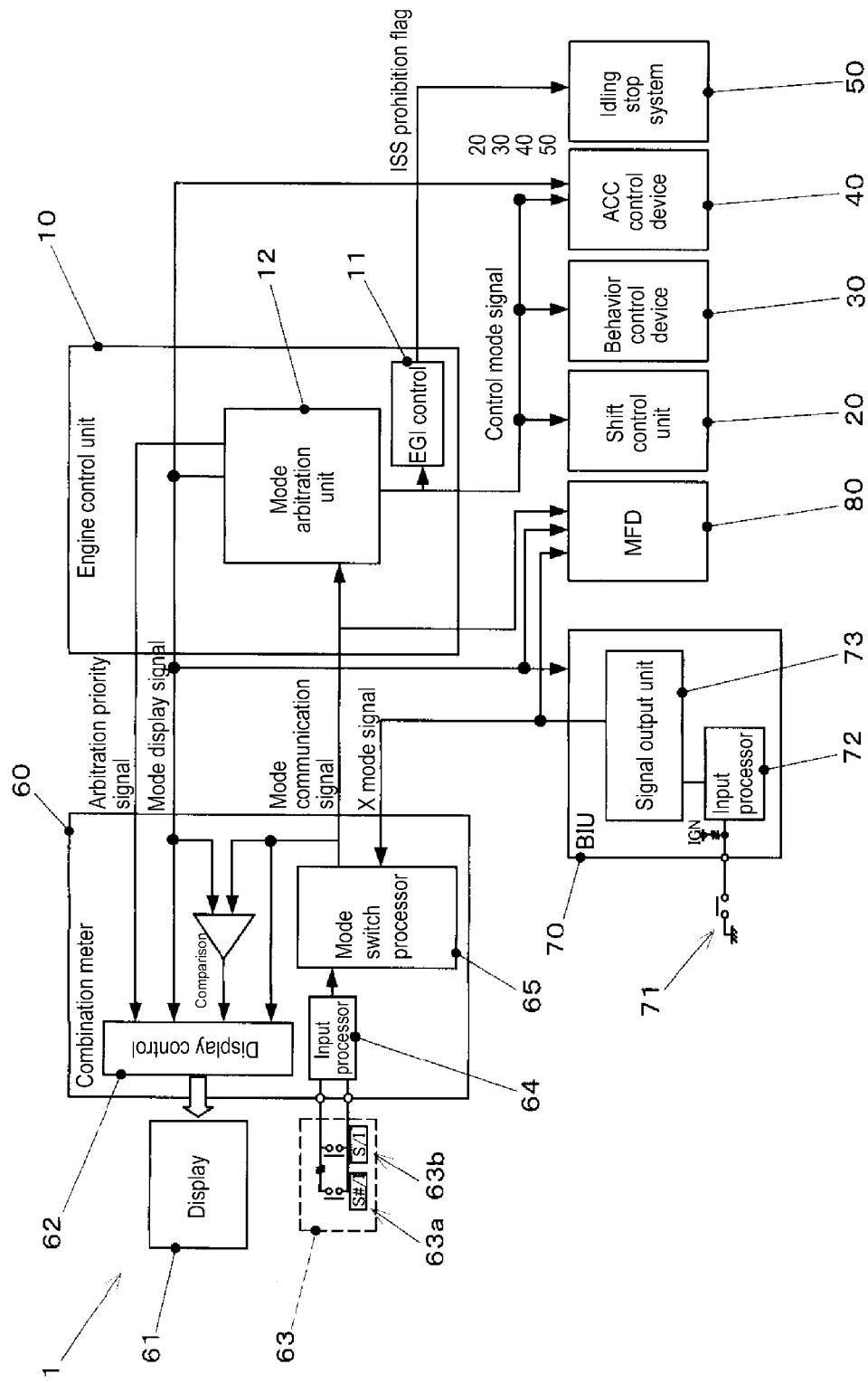
FIG. 1 is a block diagram illustrating a configuration a vehicle controller according to an example of the present invention.

FIG. 1 is a block diagram illustrating a configuration of the vehicle controller according to this example.

A vehicle controller 1 includes an engine control unit 10, a shift control unit 20, a behavior control device 30, an adaptive cruise control (ACC) control device 40, an idling stop system (ISS) 50, a combination meter 60, a body integrated unit 70, a multifunction display (MFD) 80, and so on.

These components are capable of communicating with each other using a CAN communication system or the like, which is a type of in-vehicle LAN.

The engine control unit 10 performs overall control of an engine and accessories thereof, which are not illustrated in the drawing.

The engine control unit 10 includes an information processing device such as a CPU, a storage such as a RAM and a ROM, an input/output interface, a bus connecting these components, and so on.

The engine control unit 10 has a function for controlling an actuator of an electric throttle valve that adjusts an intake air amount of the engine in accordance with an operation amount of an accelerator pedal, which is not illustrated in the drawing.

The accelerator pedal is a foot pedal operated by a driver. The operation amount (a pedal stroke) thereof is detected by a position encoder and transmitted to the engine control unit 10.

The engine control unit 10 sets a target engine torque on the basis of the accelerator pedal operation amount, and drives the throttle actuator in accordance with the target engine torque to obtain a throttle valve opening at which the target engine torque can be achieved.

The engine control unit 10 according to this example includes multiple travel modes (vehicle control modes) having respectively different correlations between the accelerator pedal operation amount and the target engine torque.

The travel modes include an I mode, an S mode, and an S# mode, which are used during normal travel (good road travel), and an X mode used during poor road travel.

Each of these modes will be described in detail below.

The engine control unit 10 includes an EGI control unit 11, a mode arbitration unit 12, and so on.

The EGI control unit 11 controls fuel injection timings, fuel injection amounts, and so on of injectors (fuel injection valves) provided in respective cylinders of the engine.

The EGI control unit 11 also has a function for raising an ISS prohibition flag and transmitting the raised ISS prohibition flag to the idling stop system 50 when the engine satisfies a predetermined idling stop prohibition condition.

The mode arbitration unit 12 determines a single travel mode to be actually applied by performing mode arbitration on the basis of a travel mode required by the respective devices and units, and various preset arbitration conditions.

For instance, when an engine coolant temperature is in a predetermined low temperature condition, when the engine coolant temperature or an engine lubricating oil temperature is in a predetermined high temperature condition, when an engine malfunction warning lamp (an MIL) is illuminated, when a reverse range is selected in a transmission, and so on, the mode arbitration unit 12 permits or prohibits a mode transition in accordance with the preset arbitration conditions.

The mode arbitration unit 12 then transmits a vehicle control mode signal indicating the determined mode to each unit.

The shift control unit 20 performs overall control of the transmission, which decelerates or shifts an output of the engine and transmits the output to a transfer, and the transfer, which transmits the output of the transmission to a front-rear differential.

The transmission is a chain type, belt type, or other type continuously variable transmission (CVT), for instance, but is not limited thereto, and may be a stepped AT having a plurality of planetary gear sets, a DCT, an AMT, and so on, for instance.

The transfer includes, for instance, a bevel gear type or planetary gear type center differential device, and an electronic control coupling that restricts a difference between a front wheel side output and a rear wheel side output.

Instead of this combination of a mechanical center differential and a difference limiting coupling, a configuration in which one of respective axle differentials of a front wheel and a rear wheel is directly coupled to an output shaft of the transmission and a driving force transmission force transmitted to the other can be varied by the electronic control coupling may be employed.

The shift control unit 20 performs shift control, lockup control, and line pressure control on the transmission described above, and engagement force control on the transfer.

The behavior control device 30 performs behavior control for stabilizing the vehicle, antilock brake control, and so on by generating a differential braking force between inner and outer turning wheels when behavior such as understeer, oversteer, or the like occurs using a hydraulic control unit capable of individually controlling fluid pressure in service brakes provided on the respective vehicle wheels.

The behavior control device 30 also has a function for performing hill descent control (HDC), in which the braking force of the respective vehicle wheels is controlled to maintain a vehicle speed substantially at or below a predetermined value on a downhill road when the X mode for poor road travel is selected.

Further, a vehicle speed sensor is connected to the behavior control device 30 to detect a vehicle wheel speed of each vehicle wheel.

The behavior control device 30 also has a limited slip differential (LSD) function with which, when one left or right wheel spins, braking force is applied to the vehicle wheel on the spinning side in order to secure driving force in the other vehicle wheels.

The ACC control device 40 includes an environment recognition unit such as a stereo camera unit or a millimeter wave radar, for instance, and performs adaptive cruise control for keeping the inter-vehicle distance to the leading vehicle at a predetermined set value.

The ACC control device 40 performs tracking control by adjusting the driving force in cooperation with the engine control device 10 and the shift control unit 20, and when necessary, operating the brake in cooperation with the behavior control device 30.

The idling stop system (ISS) 50 performs idling stop control by stopping the engine when a predetermined idling stop condition is satisfied, and restarting the engine automatically when a predetermined restart condition is satisfied thereafter.

The combination meter 60 is an instrument panel including a speedometer, an engine tachometer, a fuel gauge, various warning lamps, and so on, and also includes a CPU serving as an information processing device and so on for controlling displays by these components.

The combination meter 60 includes a display 61 serving as an image display device constituted by an LCD or the like, for instance, and a display control 62 for controlling the display 61.

The display 61 displays various pieces of information such as the currently selected travel mode.

The combination meter 60 also includes a travel mode switch 63, an input processor 64, and a mode switch processor 65.

The travel mode switch 63 is an operating unit on which an operation is performed to select the I mode, the S mode, and the S# mode, i.e. the travel modes used during normal travel.

The travel mode switch 63 includes an S#/I switch 63a and an S/I switch 63b provided on an instrument panel, for instance.

Functions of these switches will be described in detail below.

The input processor 64 processes an output of the mode switch 63 and transfers the processed output to the mode switch processor 65.

The mode switch processor 65 determines the travel mode desired by a user on the basis of input from the input processor 64, and transmits a mode communication signal indicating the desired mode to the mode arbitration unit 12 of the engine control unit 10.

Further, the mode switch processor 65 receives an X mode switch signal from a signal processor 73 of the body integrated unit 70.

On the basis of the various input signals, the mode switch processor 65 performs mode determination processing, mode backup processing, advance mode storage processing, and so on.

The body integrated unit 70 performs overall control of various electric equipment provided in the vehicle.

Further, the body integrated unit 70 is provided with an X mode switch 71, an input processor 72, the signal output unit 73, and so on.

The X mode switch 71 is a push button switch provided on the instrument panel, for instance, which is pressed by the user to select or cancel the X mode, i.e. the poor road travel mode.

The input processor 72 processes input from the X mode switch 71 to determine whether or not the user wishes to select the X mode, and transmits a determination result to the signal output unit 73.

The input processor 72 determines a depression length of the X mode switch 71, whether or not the X mode switch 71 is fixed, and so on.

On the basis of input from the input processor 72, the signal output unit 73 transmits a condition of the X mode switch 71 and information indicating selection of the X mode by the user to the mode switch processor 65 of the combination meter 60.

The multifunction display (MFD) 80 is an image display device such as an LCD provided on the instrument panel, for instance, which displays an "X mode ON" display when the X mode has been selected, and information indicating that behavior control, ABS control, HDC control, and so on are underway.

Next, the content of each travel mode and transitions between the respective modes in the vehicle controller according to this example will be described.

Figure 2:
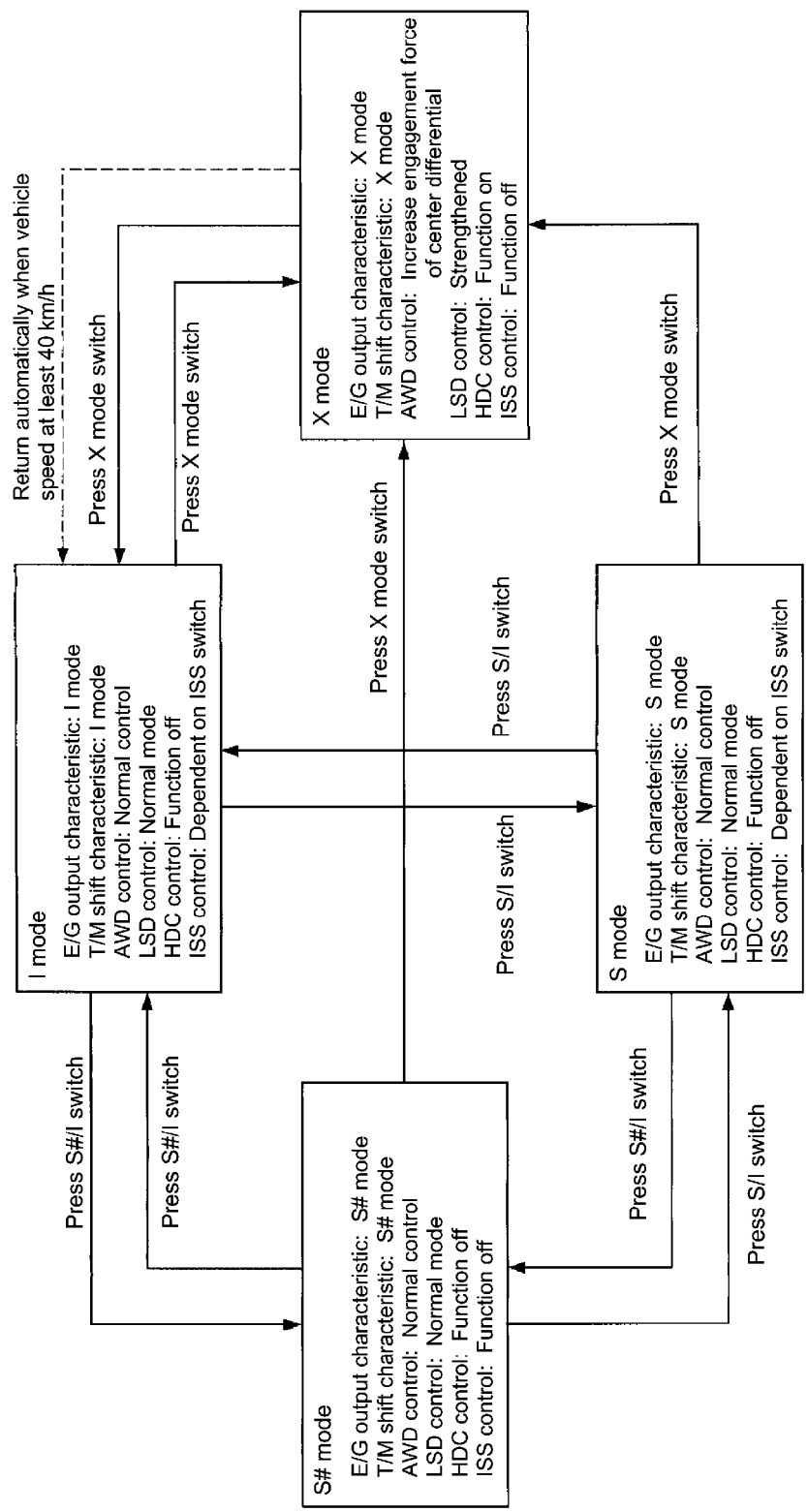
FIG. 2 is a view illustrating transitions between vehicle control modes in the vehicle controller of FIG. 1.

FIG. 2 is a view illustrating transitions between the respective vehicle control modes of the vehicle controller according to this example.

The vehicle controller according to this example includes the four travel modes (vehicle control modes) described below.

[I Mode]

The I mode is a travel mode used when the vehicle travels normally.

The I mode includes following features:

Engine Output Characteristic in I Mode

Figure 3:
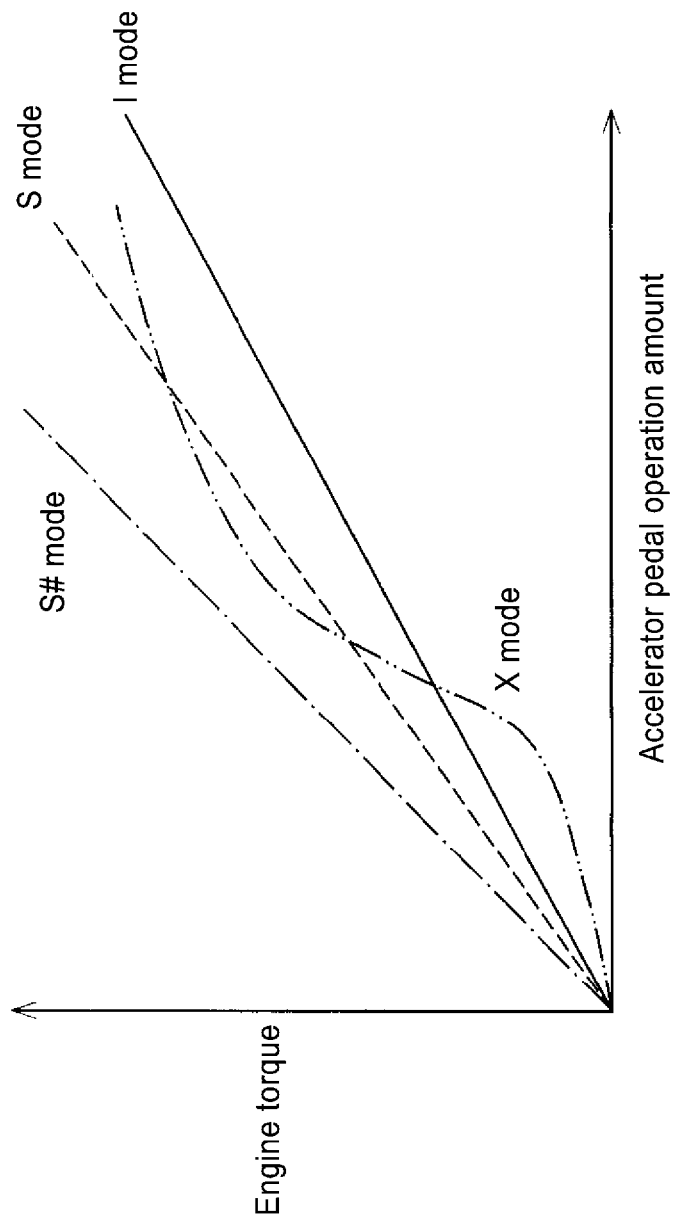
FIG. 3 is a graph illustrating correlations between an accelerator operation amount and an engine torque of the vehicle control modes of the vehicle controller illustrated in FIG. 1.

FIG. 3 is a graph illustrating correlations between the accelerator operation amount and the engine torque in the respective vehicle control modes of the vehicle controller according to this example. In FIG. 3, the ordinate shows the target engine torque, and the abscissa shows the accelerator pedal operation amount (stroke). Further, characteristics of the I mode, the S mode, the S# mode, and the X mode are indicated respectively by a solid line, a dotted line, a dot-dash line, and a dot-dot-dash line.

In the I mode, a rate (an incline of the graph in FIG. 3) at which the engine output (the torque) increases relative to the accelerator pedal operation amount is reduced in comparison with the S mode and the S# mode, whereby a gentle engine characteristic is obtained.

This variation in the output characteristic can be realized by varying the opening of the electric throttle valve relative to the accelerator pedal operation amount.

Transmission Shift Characteristic in I Mode

In the I mode, importance is placed on fuel efficiency and quietness, and therefore shift control is performed such that an engine rotation speed is lower than those of the S mode and the S# mode.

AWD Control: Normal Mode

Control of the engagement force of the transfer and so on by the shift control unit 20 is performed in a normal mode optimized for good road travel.

LSD Characteristic: Normal Mode

LSD control by the behavior control device 30 is performed in a normal mode optimized for good road travel.

HDC Control: Function OFF

HDC control by the behavior control device 30 is set in an inoperative condition.

ISS Control: Dependent on ISS Switch

Idling stop control by the idling stop system 50 is set in an operative condition as long as the user has not canceled the idling stop control using an ISS switch, not illustrated in the drawings.

[S Mode]

The S mode is a travel mode used during normal vehicle travel, in which control is performed so as to prioritize a travel performance, such as an acceleration performance, over the fuel efficiency, quietness, and so on prioritized in the I mode.

The S mode includes the following features:

Engine Output Characteristic in S Mode

As illustrated in FIG. 3, in the S mode, the rate of increase in the engine output (the torque) relative to the accelerator pedal operation amount is increased relative to the I mode, whereby an engine characteristic prioritizing output over the I mode is obtained.

Transmission Shift Characteristic in S Mode

In the S mode, shift control is performed such that the engine rotation speed is higher than that of the I mode.

AWD Control: Normal Mode

Control of the engagement force of the transfer and so on by the shift control unit 20 is performed in the normal mode optimized for good road travel.

LSD Characteristic: Normal Mode

LSD control by the behavior control device 30 is performed in the normal mode optimized for good road travel.

HDC Control: Function OFF

HDC control by the behavior control device 30 is set in an inoperative condition.

ISS Control: Dependent on ISS Switch

Idling stop control by the idling stop system 50 is set in an operative condition as long as the user has not canceled the idling stop control using the ISS switch, not illustrated in the drawings.

[S# Mode]

The S# mode is a travel mode used during normal vehicle travel, in which control is performed so as to prioritize the travel performance, such as the acceleration performance, even more than in the S mode.

The S# mode includes the following features:

Engine Output Characteristic in S# Mode

As illustrated in FIG. 3, in the S# mode, the rate of increase in the engine output (the torque) relative to the accelerator pedal operation amount is increased relative to the S mode, whereby an engine characteristic prioritizing output even more than in the S mode is obtained.

Transmission Shift Characteristic in S# Mode

In the S# mode, shift control is performed such that the engine rotation speed is even higher than that of the S mode.

AWD Control: Normal Mode

Control of the engagement force of the transfer and so on by the shift control unit 20 is performed in the normal mode optimized for good road travel.

LSD Characteristic: Normal Mode

LSD control by the behavior control device 30 is performed in the normal mode optimized for good road travel.

HDC Control: Function OFF

HDC control by the behavior control device 30 is set in an inoperative condition.

ISS Control: OFF

Idling stop control by the idling stop system 50 is set in an inoperative condition.

ACC control by the ACC control device 40 is set in an inoperative condition.

[X Mode (Poor Road Travel Mode)]

The X mode is a poor road travel mode used when the vehicle travels on a poor road such as an irregular road surface of an unpaved road or the like and a low frictional coefficient road surface of a snowy road, a frozen road, or the like.

The X mode includes the following features:

Engine Output Characteristic in X Mode

As illustrated in FIG. 3, in the X mode, the rate of increase in the engine output (the torque) relative to the accelerator operation amount during an initial stage of an accelerator pedal operation is reduced below that of the I mode in order to suppress rapid torque generation when the accelerator pedal is initially depressed.

From an intermediate stage of the accelerator pedal operation onward (from the vicinity of an intermediate point of the pedal stroke onward), on the other hand, the rate of increase in the engine output relative to the accelerator pedal operation amount is increased in order to obtain a large output required to climb a steep hill or the like. Hence, in a latter half of the accelerator pedal stroke, an output substantially comparable to that of the S mode is obtained.

Transmission Shift Characteristic in X Mode

In the X mode, shift control is performed such that the engine rotation speed is higher than that of the I mode, whereby a stronger engine brake is obtained when the accelerator pedal is released.

AWD Control: Normal Mode

Control of the engagement force of the transfer and so on by the shift control unit 20 is performed in a poor road mode in which the engagement force of the transfer is strengthened in comparison with the normal mode in order to improve a ground covering ability on poor roads.

LSD Characteristic: Normal Mode

LSD control by the behavior control device 30 is performed in a poor road mode in which an operation response is improved and a differential limiting force is strengthened in comparison with the normal mode.

HDC Control: Function OFF

HDC control by the behavior control device 30 is set in an operative condition.

ISS Control: OFF

Idling stop control by the idling stop system 50 is set in an inoperative condition.

Further, in the X mode, ACC control by the ACC control device 40 is set in an inoperative condition. In the other modes, the operative condition and the inoperative condition can be selected using an ACC switch, not illustrated in the drawings.

Next, transitions between the respective modes will be described.

As illustrated in FIG. 2, a transition from the I mode to the S mode is performed by pressing the S/I switch 63*b*.

Similarly, a transition from the S mode to the I mode is performed by pressing the S/I switch 63*b*.

Further, a transition from the S mode to the S# mode is performed by pressing the S#/I switch 63*a*.

On the other hand, a transition from the S# mode to the S mode is performed by pressing the S/I switch 63*b*.

Further, a transition from the I mode to the S# mode is performed by pressing the S#/I switch 63*a*.

Similarly, a transition from the S# mode to the I mode is performed by pressing the S#/I switch 63*a*.

Furthermore, respective transitions from the I mode, the S mode, and the S# mode to the X mode are performed by pressing the X mode switch 71.

Note, however, that a transition operation to the X mode is received only when the vehicle speed is equal to or lower than a predetermined value (20 km/h, for instance), and when the vehicle speed is higher than the predetermined value, the current mode is maintained even after the X mode switch 71 is operated.

Meanwhile, when the user wishes to terminate the X mode, s/he presses the X mode switch 71 to perform a transition to the I mode, but in this case, direct transitions to the S mode and the S# mode are prohibited.

Further, when the travel speed of the vehicle is equal to or higher than a predetermined value (40 km/h, for instance), the mode switch processor 65 automatically performs a transition from the X mode to the I mode, but likewise in this case, direct transitions to the S mode and the S# mode are prohibited.

Note that at this time, the shift control unit 20 performs a drive wheel slippage determination on the basis of a rotation speed of the output shaft thereof, the vehicle wheel speeds of the respective vehicle wheels, a front-rear direction acceleration of the vehicle, and so on, and when the slippage determination is established (i.e. when at least one wheel is determined to be spinning), transitions from the X mode to the other modes are prohibited.

For instance, an estimated vehicle acceleration calculated from a progression of the output shaft rotation speed and the vehicle wheel speeds may be compared with an actual vehicle front-rear acceleration detected by a front-rear G sensor, and the slippage determination may be established when the two values deviate by at least a predetermined value.

According to the example described above, following effects can be obtained.

(1) When the X mode is selected, transitions to the S mode and the S# mode, which differ greatly from the X mode in the output characteristic during the initial stage of the accelerator pedal (when the accelerator pedal is initially depressed) are prohibited, and therefore a rapid increase in output unintended by the driver when the accelerator pedal is initially depressed, causing the vehicle to accelerate rapidly, can be prevented.

(2) When the travel speed reaches or exceeds 40 km/h such that poor road travel is determined to be substantially over, a transition is performed automatically from the X mode to the I mode. As a result, convenience can be improved, and inappropriate use of the X mode during high speed travel can be prevented.

(3) When the X mode switch is depressed while the X mode is selected, a transition is performed to the I mode. Therefore, when the user wishes to terminate the X mode, a transition can be performed to the I mode, which differs least among the normal travel modes from the X mode in the initial response, without any particular need for the user to consider travel mode selection.

(4) When the slippage determination is established, a transition from the X mode to the I mode is prohibited. Therefore, a situation in which a transition is performed from the X mode to the I mode either automatically or in response to a user operation in a case where slippage occurs such that the value indicated by the vehicle speed sensor is higher than an actual vehicle body speed, leading to a reduction in the poor road ground covering ability of the vehicle, can be prevented, and as a result, situations in which the vehicle becomes stuck and so on can be forestalled.

(Modifications)

The present invention is not limited to the example described above, and may be subjected to various modifications and alterations, which are also within the technical scope of the present invention.

For instance, in the example, the travel power source is a gasoline engine, and the output characteristic differences among the respective modes are generated by controlling the electric throttle valve. However, when the travel power source is a diesel engine, for instance, the output characteristic may be varied using the fuel injection amount. A turbocharging pressure of a turbocharger or the like may also be varied.

The travel power source may also be an electric motor, or a hybrid system combining an electric motor and an internal combustion engine.

Furthermore, the vehicle according to the example includes an automatic transmission, for instance, but the present invention may also be applied to a vehicle using a manual transmission. Moreover, there are no particular limitations on the driving system.

Further, in the example, three travel modes are provided as the normal travel modes, but the present invention may also be applied to a vehicle having two, four, or more normal travel modes.

The invention claimed is:

1. A vehicle controller having vehicle control modes that have different output characteristics of a travel power source relative to an accelerator operation amount, wherein
   the vehicle control modes include a poor road travel mode used during travel on a poor road, and a first normal travel mode and a second normal travel mode, the normal travel modes being used during travel other than on a poor road;
   a rate of increase in an output of the travel power source relative to a predetermined accelerator operation amount during an initial stage of an accelerator operation is set to increase steadily wherein the rate of increase for the second normal travel mode is greater than the first normal travel mode, and the rate of increase for the first normal travel mode is greater than the poor road travel mode; and
   when the poor road travel mode is selected, an automatic or manual mode transition is permitted only to the first normal travel mode,
   wherein the travel power source is at least one of an internal combustion engine and an electric motor.

2. The vehicle controller according to claim 1, wherein, when a travel speed of a vehicle reaches or exceeds a predetermined value while the poor road travel mode is selected, a mode transition to the first normal travel mode is performed automatically.

3. The vehicle controller according to claim 1, wherein, when a predetermined poor road travel mode termination operation is input by a user while the poor road travel mode is selected, a mode transition to the first normal travel mode is performed.

4. The vehicle controller according to claim 2, wherein, when a predetermined poor road travel mode termination operation is input by a user while the poor road travel mode is selected, a mode transition to the first normal travel mode is performed.

5. The vehicle controller according to claim 1, further comprising a slippage detector to detect slippage of all or a part of vehicle wheels, wherein, when slippage is detected while the poor road travel mode is selected, a mode transition to the first normal travel mode is prohibited regardless of other conditions.

6. The vehicle controller according to claim 2, further comprising a slippage detector to detect slippage of all or a part of vehicle wheels, wherein, when slippage is detected while the poor road travel mode is selected, a mode transition to the first normal travel mode is prohibited regardless of other conditions.

7. The vehicle controller according to claim 3, further comprising a slippage detector to detect slippage of all or a part of vehicle wheels, wherein, when slippage is detected while the poor road travel mode is selected, a mode transition to the first normal travel mode is prohibited regardless of other conditions.

8. The vehicle controller according to claim 4, further comprising a slippage detector to detect slippage of all or a part of vehicle wheels, wherein, when slippage is detected while the poor road travel mode is selected, a mode transition to the first normal travel mode is prohibited regardless of other conditions.

9. The vehicle controller according to claim 1, wherein transitioning between the poor travel mode, the first normal travel mode and the second normal travel mode alters one or more vehicle conditions, and
   wherein the vehicle conditions are at least one of a travel power source torque, gear shift control, all wheel drive, fuel injector timing, fuel injector amounts, antilock brake control, hill decent control, limited slip differential, environmental recognition, and idling stop control.

\* \* \* \* \*